United States Patent [19]

Murase

[11] 4,444,517

[45] Apr. 24, 1984

[54] ELECTRONIC CLINICAL THERMOMETER

[75] Inventor: Masakazu Murase, Fuji, Japan

[73] Assignee: Terumo Kabushiki Kaisha, Tokyo, Japan

[21] Appl. No.: 417,877

[22] Filed: Sep. 14, 1982

[30] Foreign Application Priority Data

Dec. 18, 1981 [JP] Japan .............................. 56-205997

[51] Int. Cl.³ .............................................. G01K 5/00
[52] U.S. Cl. ..................................... 374/188; 374/183; 374/208
[58] Field of Search ................ 374/188, 183, 184, 185, 374/208, 205, 206, 207; 340/586, 593, 595, 596, 597, 598, 599; 335/205, 207

[56] References Cited

U.S. PATENT DOCUMENTS

| 3,872,728 | 3/1975 | Joyce et al. | 374/185 |
| 3,906,797 | 9/1975 | Turner. | |
| 3,978,325 | 8/1976 | Goldstein et al. | |
| 4,031,365 | 6/1977 | Raggiotti et al. | 374/183 |
| 4,174,631 | 11/1979 | Hammerslag | 374/179 |
| 4,199,986 | 4/1980 | Ganslmeier et al. | 374/183 |
| 4,206,649 | 6/1980 | Nagaie | 374/183 |
| 4,371,271 | 2/1983 | Bellet | 374/183 |
| 4,396,301 | 8/1983 | Stucki | 374/188 |

FOREIGN PATENT DOCUMENTS

| WO80/01317 | 6/1980 | PCT Int'l Appl. . |
| 1167444 | 10/1969 | United Kingdom . |
| 1422711 | 1/1976 | United Kingdom . |
| 1423535 | 2/1976 | United Kingdom . |
| 2005420 | 4/1979 | United Kingdom . |

Primary Examiner—Charles Frankfort
Assistant Examiner—David R. Schuster
Attorney, Agent, or Firm—Frishauf, Holtz, Goodman & Woodward

[57] ABSTRACT

An electronic clinical thermometer which includes a temperature sensing element for sensing body temperature and converting the sensed body temperature into a corresponding electrical signal, a measuring unit for converting the electrical signal into a digital signal, an arithmetic unit for computing body temperature on the basis of the digital signal, a display unit for displaying the computed body temperature, a battery for supplying each of these loads with electric power, and a magnetic reed switch, having a break-type contact, connected between the battery and the load. The electronic clinical thermometer, in combination with a carrying case, includes a magnet which opens the switch contact of the magnetic reed relay when the thermometer is placed in the case.

7 Claims, 7 Drawing Figures

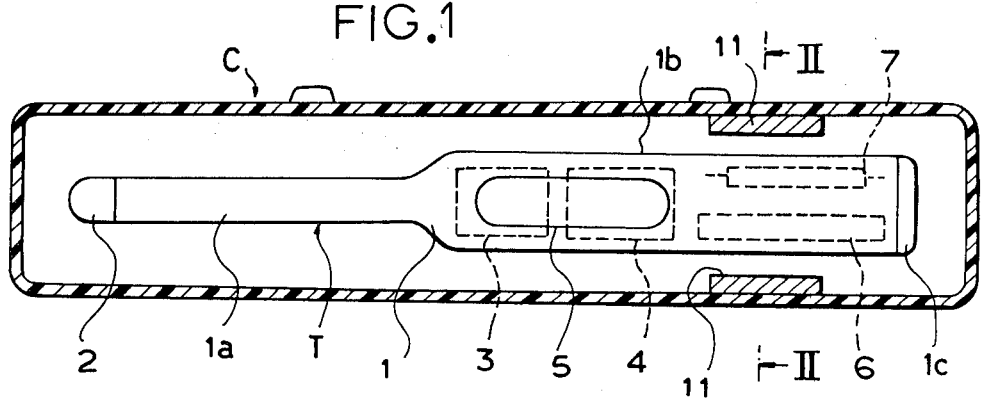
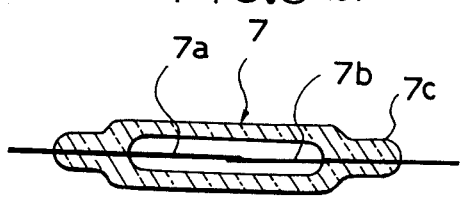
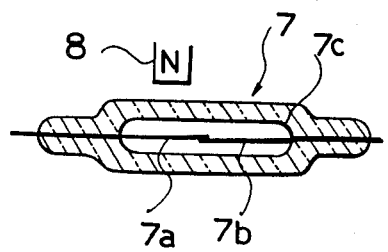
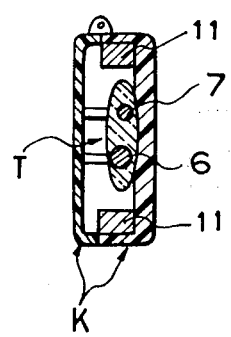

ELECTRONIC CLINICAL THERMOMETER

BACKGROUND OF THE INVENTION

This invention relates to an electronic clinical thermometer, of approximately the same size as the conventional glass clinical thermometer, for taking a patients temperature electronically and for displaying the temperature digitally or in the form of a bar signal.

An electronic clinical thermometer generally comprises an elongate hollow enclosure for accommodating a temperature sensing element which converts temperature information into an electrical signal, a measuring unit for converting the electrical signal into a processable signal, an arithmetic unit for computing the temperature from the converted signal, a display unit for displaying the temperature computed by the arithmetic unit, a battery for supplying the abovementioned units with electrical power, and a switch connected between the battery and each unit.

Conventional electronic clinical thermometers employ manually operable means such as a slide switch for the abovementioned switch. A switch of such type has a knob which protrudes from the enclosure. When the thermometer is immersed in a disinfectant such as alcohol for the purpose of maintaining hygiene, the result can be poor switch contact as well as system malfunction due to corrosion of the electronic circuitry through the protruding portion of the switch into the electronic clinical thermometer. Though these defects can be improved upon by adpoting a water-proof construction at the location where the switch knob protrudes from the enclosure, such an expedient is disadvantageous in that the switch has a complicated structure and is large in size and that higher costs are entailed. Furthermore, since the switch has a mechanical structure and must possess sufficient durability and reliability, a major reduction in size is not possible. Accommodating a mechanical switch leads to an enclosure of enlarged diameter and makes it difficult to reduce the size of the thermometer to that of a mercury thermometer, even though electronic circuit attains reduction in size. Also, since electronic clinical thermometers rely on digital circuitry, a loss of battery power is large when the user forgets to turn off the switch and, since the battery is of small capacity, the battery will run down and become useless in a shorter period of time in comparison with electronic thermometers that use analog circuitry.

SUMMARY OF THE INVENTION

Accordingly, the present invention has been devised in order to eliminate the aforementioned disadvantages encountered in the prior art.

An object of the present invention, therefore, is to provide a compact electronic clinical thermometer which, through use of a magnetic reed switch, enables the enclosure to be sealed liquid-tightly to solve the problem of disinfectant penetration when the thermometer is immersed in a disinfectant such as alcohol because there is no need to provide a hole in the enclosure for operating the switch and, as a result, to eliminate malfunctions due to corrosion of the circuitry caused by a disinfectant, the outer surface being smooth to be suitable for disinfection.

Another object of the present invention is to provide an electronic clinical thermometer which, by being equipped with a magnetic reed switch and placed in a carrying case provided with a magnetic field, assures that the switch will be turned on and off automatically, thereby enhancing operability, eliminating wasteful consumption of the battery which would otherwise occur if the switch were left on inadvertantly, and solving the problem of dark current that arises in ordinary transistor switches, the magnetic reed switch exhibiting a durability and reliability far superior to those of a comparably sized mechanical switch so that the thermometer, enhanced also by LSI techniques, has excellent overall durability and reliability as well as a size approximately equivalent to that of a mercury thermometer, with a battery change being necessary only rarely.

In accordance with one aspect of the present invention, these objects are attained by providing an electronic clinical thermometer which comprises a temperature sensing element for sensing body temperature and converting the sensed body temperature into a corresponding electrical signal, a measuring unit for converting the electrical signal into a digital signal, an arithmetic unit for computing body temperature on the basis of the digital signal, a display unit for displaying the computed body temperature, a battery for supplying each of the means with electric power, a switch connected between the battery and each of the loads, and an enclosure for accommodating at least the measuring unit, arithmetic unit, display unit, the battery and the switch, the switch comprising a magnetic reed switch which is open when placed in a magnetic field from field generating means provided external to the enclosure, and which is closed when withdrawn from the magnetic field. In another aspect of the invention, the electronic clinical thermometer having the foregoing features further includes a case having a permanent magnet as the abovementioned field generating means.

More specifically, an electronic clinical thermometer according to another aspect of the invention includes a temperature sensing element for sensing body temperature and converting the sensed body temperature into a corresponding electrical signal, a measuring unit for converting the electrical signal into a digital signal, an arithmetic unit for computing body temperature on the basis of the digital signal, a display unit for displaying the computed body temperature, a battery for supplying each of the means with electrical power, a switch connected between the battery and each of the loads, an enclosure for accommodating at least the measuring unit, arithmetic unit, display unit, the battery and the switch, a case for receiving the enclosure, and a permanent magnet provided in the case at a prescribed location, the switch comprising a magnetic reed switch which is open when placed in a magnetic field produced by the permanent magnet, and closed when withdrawn from the magnetic field.

The electronic clinical thermometer of the invention may have a flat, rod-shaped configuration, similar to that of the conventional flat-type mercury clinical thermometer used widely in Japan and Germany with only the end having the temperature sensing element being narrower in shape. The magnetic reed switch is of the closed-contact type, housed within a small glass tube filled with an inert gas, and comprises a pair of reed members, consisting of a magnetic material, each extending in cantilevered fashion from the ends of the glass tube, the free ends of the reed members overlapping each other. The reed switch of this type is much smaller than the conventional slide switch. In operation, at least one of the two reed members is magnetically attracted by the action of a magnetic field from the field generating means located outside the tube, whereby the reed member is deflected from its mate to open the switch. In order for the magnetic reed switch, which is accommodated within the thermometer enclosure, to be opened by the field generating means located outside of the enclosure, the field generating means is so disposed relative to the reed switch that the attractive force acts perpendicular to the plane in which the reed members overlap.

When not in use, the electronic clinical thermometer must always be stored while oriented in a given direction relative to the magnetic field. If the thermometer is to be received in the case when not in use, then this must be done in such fashion that the proper positional relationship is maintained between the field generating means and the magnetic reed switch. With these considerations in mind, in accordance with a preferred embodiment of the electronic clinical thermometer, at least part of the thermometer enclosure is formed into a portion having a substantially flat transverse cross section, and the magnetic reed switch is accommodated within said portion on the major axis of the transverse cross section and offset from the center of the major axis. Thus the reeds of the reed switch are accommodated within the enclosure while oriented in a given direction with respect to the thermometer. Then, the case for holding the thermometer is formed to include a space for receiving the portion having the substantially flat transverse cross section. At least two permanent magnets are provided within the case on both sides of the plane in which the reed members overlap when the thermometer is placed in the case, the line connecting the two magnets lying perpendicular to said plane.

The electronic clinical thermometer of the invention may have a rod-shaped external appearance or, in an extreme case, an arcuate configuration. However, a geometry substantially the same as the flat-type mercury clinical thermometer is preferred since such is best suited for conventional use. Therefore, an electronic clinical thermometer according to the present invention has an enclosure which defines a longitudinally extending hollow body, and the temperature sensing element is attached to one end of the enclosure in a liquid-tight manner relative to the interior of the hollow body. Further, in order to accommodate the measuring, arithmetic and display units, as well as the battery and switch within the thermometer enclosure in a liquid-tight manner, the end of the enclosure opposite the temperature sensing element is provided with a cap that can be removed to exchange the battery, the liquid-tight seal being assured by an O-ring interposed between the cap and said end of the enclosure.

Other features and advantages of the invention will be apparent from the following description taken in conjunction with the accompanying drawings in which like reference characters designate the same or similar parts throughout the figures thereof.

BRIEF DESCRIPTION OF THE DRAWINGS

FIG. 1 is a front view illustrating an embodiment of an electronic clinical thermometer according to the present invention, the thermometer being shown accommodated in a case;

FIG. 2 is a sectional view taken along the line II—II of FIG. 1;

FIGS. 3A and 3B are sectional views illustrating a closed contact-type magnetic reed switch employed in the electronic clinical thermometer of the present invention, (A) showing the contact closed and (B) showing the contact open;

DESCRIPTION OF THE PREFERRED EMBODIMENT

Figure 4:
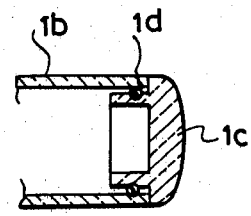
FIGS. 4 and 5 are sectional views illustrating a liquid-tight construction for attaching an end cap to the thermometer enclosure according to different modifications of the invention.

FIG. 1 shows an electronic clinical thermometer according to the present invention, as well as a thermometer case equipped with a permanent magnet as means for producing a magnetic field.

When not in use, the electronic clinical thermometer according to one aspect of the invention is stored in the presence of a magnetic field produced by field generating means. To this end, the thermometer T may be stored in a case C or on a pallet P (FIG. 6) having field generating means provided at a suitable location thereof.

In another aspect of the present invention, the electronic clinical thermometer T itself is identical to that mentioned above but is accommodated in its own separately formed case C, so that the case also constitutes one characterizing element or feature of the invention. In addition, the case C is equipped with field generating means which, for the sake of portability, is limited to a permanent magnet, the latter also constituting a distinguishing feature of this second aspect of the invention.

Reference will now be had to FIGS. 1 and 2 to describe a preferred embodiment of an electronic clincal thermometer according to the present invention.

In FIG. 1, the electronic clinical thermometer T includes an enclosure 1 having a temperature sensing element 2 attached to the distal end thereof, as well as a temperature measuring unit 3, arithmetic unit 4, display unit 5, battery 6 and magnet reed switch 7 which are accommodated within the enclosure 1. The enclosure 1 is made of plastic and defines a hollow, elongate body of a prescribed shape, formed so as to have a geometry approximately the same as that of, say, a flat-type mercury thermometer. Thus the enclosure 1 may comprise a small-diameter portion, specifically a tip portion 1a of a circular cross section, and a large-diameter portion 1b of a substantially flat or, preferably, elliptical cross section. The distal end of the large-diameter portion 1b is provided with a cap 1c.

Figure 6:
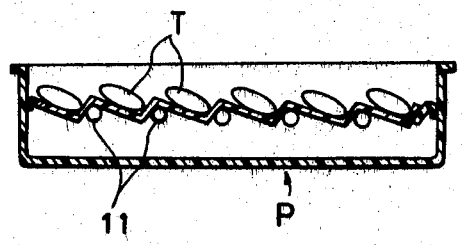
FIG. 6 is a sectional view illustrating electronic clinical thermometers placed on an arranging pallet.

The temperature sensing element 2 is a thermally sensitive resistance-variable element such as a thermister or any other heat sensor and is adapted to convert body temperature information into an electric signal. The sensing element 2 is attached to the tip of the enclosure 1 in a liquid-tight fashion. It should be noted that the shape of the hollow enclosure 1 is not particularly limited, and that the temperature sensing element 2 can be attached to the enclosure 1 at the most suitable location. For example, as shown in FIG. 6, the electronic clinical thermometer can be modified in shape to permit the body temperature of an infant to be measured with ease in a short period of time by placing the thermometer in the infant's armpit.

The measuring unit 3, through use of an RC oscillator circuit of which the thermally sensitive resistance-variable element such as the thermister is a part, produces an output signal indicative of the change in resistance, namely of the change in oscillation frequency (the change in the number of pulses per unit of time). A common analog-to-digital converter may be used to convert the analog signal from the sensing element 2 into a digital signal. Using the RC oscillator circuit is advantageous, however, since it is simpler in circuit construction and consumes less electric power than other conversion systems.

The arithmetic unit 4 may comprise an adder and a memory (ROM) in which compensatory values would be written in advance in order to linearize the non-linear characteristics of the sensing element. The arithmetic unit 4 is so arranged that a digital signal delivered by the measuring unit 3 is applied to the adder as a numerical value and to the ROM as an address signal. The compensatory value corresponding to the address is read out of the ROM and applied to the adder, which then proceeds to add the digital value and said compensatory value to produce a linear output. Thereafter, the linear output is converted into a signal indicative of a centigrade or Fahrenheit value for direct delivery, or may be used to predict final temperature, wherein the prediction is based on the rate of temperature rise over a predetermined time period. It is therefore unnecessary to perform corrective adjustments using a variable resistor or the like, so there can be no difficulties related to poor variable resistor contact. The thermometer therefore is extremely reliable.

The display unit 5 may employ a liquid crystal digital display device or the like, wherein the digital signal is received from the arithmetic unit 4 and displayed in digital form. The display unit 5 is accommodated at a suitable location within the large-diameter portion 1b of the enclosure 1 so as to be visible from the outside.

Aside from the measuring unit 3, arithmetic unit 4 and display device of the display unit 5, a driver, constructed using LSI techniques, is accommodated within the large-diameter portion 1b of the enclosure 1 at a suitable location. The enclosure 1 should be transparent, at least at the portion thereof corresponding to the display unit 5. Using liquid crystal means for the display unit is advantageous because of the low power consumption thereof. The battery 6 may be a rod-shaped lithium cell, rated at three volts D.C., and serves to supply power to each loading element. As shown, the battery 6 is accommodated within the large-diameter portion 1b of the enclosure and is situated near end cap 1c in order to be readily accessible for replacement.

The switch 7 is a normally-closed type magnetic reed switch whose contact opens and closes when the switch is immersed in and withdrawn from a magnetic field, respectively, the field being produced by field generating means comprising a permanent magnet 11 provided outside of the thermometer enclosure 1. As is well known, the magnetic reed switch 7, shown in FIGS. 3A and 3B, has a pair of reed members 7a, 7b consisting of a magnetic material. Each reed member is supported at one end, in cantilever fashion, within a glass tube 7c, with the free ends of the reed members overlapping each other. Sealed within the glass tube 7c is an inert gas. The entire reed switch package is much smaller than the conventional slide switch or other manual switches. The normally-closed magnetic reed switch of this kind is so adapted that the overlapping ends of the reed members 7a, 7b separate from each other and, thus, open the switch when acted upon by a magnetic field. Such a switch is capable of operating at least 100 million times if used at the rated voltage and current. The magnetic reed switch used in the electronic clinical thermometer of the present invention is referred to as a break-type (B-type) contact switch the overlapping reed members 7a, 7b whereof are normally closed, as illustrated in FIG. 3A.

In order to receive the magnetic reed switch 7, at least part of the enclosure 1 is formed into a portion having a substantially flat transverse cross section, e.g. elliptical or oblong, with the switch 7 being accommodated within said portion at one end of the major axis of the cross section, as shown in FIG. 2.

The electronic clinical thermometer of the invention may be adapted to produce a measurement end signal or a prediction end signal a predetermined length of time after the start of body temperature measurement.

Figure 5:
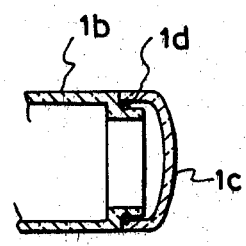

The cap 1c which allows replacement of the battery 6 is adapted to fit on the enclosure 1 in a liquid-tight manner. Preferably, as shown in FIG. 4 or FIG. 5, an O-ring 1d is provided between the abutting surfaces of the cap 1c and enclosure 1 to assure liquid-tight sealing of the enclosure interior. As shown in FIG. 4, the cap 1c is fit into the enclosure 1 from the end thereof opposite the sensing element 2, with the O-ring 1d being disposed on the inserted portion of the cap 1c. Conversely, in the modification of FIG. 5, the cap 1c is fit over said end of the enclosure and the O-ring is placed on the inserted portion of the enclosure.

In storing the electronic clinical thermometer according to this embodiment of the invention, the thermometer may be placed in a case provided with a permanent magnet 11 (any field generating means will suffice) in order to open the magnetic reed switch 7 and, hence, avoid wasteful consumption of battery power. Alternatively, in a hospital or clinic where large numbers of thermometers are used, the electronic clinical thermometer T can be placed on an arranging pallet P provided with the permanent magnet 11, as depicted in FIG. 6. Thus, according to this embodiment of the invention, it is required that the field from the permanent magnet 11 reach the thermometer to open the magnetic reed switch 7.

Another aspect of the invention is that the case C constitutes a characterizing feature of the electronic clinical thermometer. Although the shape of the case C is not specifically illustrated in FIGS. 1 and 2, the case is preferably cylindrical in shape and is adapted to be separated into two longitudinally extending half-sections for opening. The field generating means provided within the case C is limited to the permanent magnet 11 for the purpose of portability. When placing the thermometer T in the case C, the distal end having the sensing element 2 is positioned at the forward end of the case, so that the large-diameter portion of the thermometer that incorporates the reed switch 7 is located where the magnet 11 is installed. If the obverse and reverse sides of the thermometer T differ owing to the presence of the display unit 5, the arrangement preferably should be such as to assure that the magnetic reed switch 7 will open even if the thermometer is placed in the case C with its obverse side facing downward. To this end, the magnetic reed switch 7 is accommodated in the thermometer enclosure 1 at one end of the major axis of the flat transverse cross-sectional portion thereof, as mentioned above. Also, as shown in FIG. 2, two of the permanent magnets 11, each having an equivalent magnetic strength, are provided within the case C and arranged so that a pair of like poles oppose each other. Accordingly, when the electronic clinical thermometer T is placed in the case C, the distance from the magnetic reed switch 7 to each of the magnets 11 will always be different even if the obverse side of the thermometer is facing downward. It is obvious that the field intensity of the permanent magnet nearer the reed switch 7 will have the greater effect on the switch, and that the switch 7 will open in response to the field from the nearer magnet. Thus, in the preferred arrangement, the case C is cylindrical and is adapted to open longitudinally into two halves, with the permanent magnets 11 attached to the case in such a manner that like poles oppose each other with the electronic clinical thermometer being interposed therebetween when the thermometer is placed in the case. Further, the magnetic reed switch 7 is accommodated within the thermometer enclosure 1 and is positionally displaced to one side thereof. Such an arrangement assures that the reed contact of the switch 7 will be opened, by the action of the magnetic field from the nearer permanent magnet, whenever the thermometer is placed in the case C.

The operation of the present invention will now be described with reference to FIGS. 1 and 2. When the electronic clinical thermometer T is placed in the case T while oriented in a predetermined direction, the field from the field generating means, namely the permanent magnet 11, causes the normally closed reed members 7a, 7b of the magnetic reed switch 7 to open. This curtails wasteful consumption of the battery 6 and solves the problem of dark currents encountered in contactless switches that rely upon transistors switches or the like. Accordingly, if the battery 6 is a three-volt DC lithium cell or the like, the thermometer can be stored for ten years or more and still remain in an operable condition. When the thermometer T is taken out of the case C, the magnetic reed switch 7 closes automatically and thus connects the battery 6 to the heat sensing element 2, measuring unit 3, arithmetic unit 4 and display unit 5, thereby placing the thermometer in a usable condition. When the heat sensing element 2 of the thermometer T is held in place in a patient's armpit, the sensing element 2 senses the body temperature and produces an output signal of a magnitude commensurate with the temperature information. The measuring unit 3 converts this electrical signal into a digital signal which the arithmetic unit 4 uses to compute the body temperature. The arithmetic unit 4 sends a digital signal indicative of this temperature to the display unit 5, where the temperature is displayed numerically or in the form of a bar signal, based on the digital signal. When the thermometer is to be disinfected, it may be immersed in alcohol or a like agent. Since the magnetic reed switch 7 is confined within the thermometer enclosure 1, unlike the slide switch of the conventional electronic clinical thermometer, cleansing of the thermometer is more thorough due to its smooth outer surface, while the perfect liquid-tight condition of the enclosure assures that no disinfectant such as alcohol will invade the interior of the thermometer. When the thermometer T is returned to its case C, the action of the field produced by permanent magnet 11 opens the reed switch 7 automatically, so that no manual switch operation is necessary.

The specific effects of the electronic clinical thermometer according to the present invention will now be set forth. As described and illustrated hereinabove, the thermometer includes a heat sensing element for sensing body temperature and for producing an electrical signal indicative of said temperature, a measuring unit for converting the signal into a digital signal, an arithmetic unit for computing the body temperature from the digital signal, and a display unit for displaying the temperature. At least the measuring unit, arithmetic unit, display unit, the battery and the switch are accommodated within the thermometer enclosure, and the switch is a normally-closed type magnetic reed switch. By virtue of such a construction, the electronic clinical thermometer can be made almost as small as an ordinary mercury clinical thermometer, the outer surface of the enclosure can be made smooth so that cleaning and disinfection may be easy, and the interior of the enclosure can be rendered liquid-tight with facility and at low cost. Moreover, since the magnetic reed switch is opened automatically when placed in a magnetic field generated by means located outside the enclosure, the thermometer is easier to use and is not likely to experience wasteful consumption of its battery because of the switch being left closed, unlike the conventional electronic clinical thermometer which requires that a switch such as a slide switch be opened and closed manually with each use. Furthermore, since the electronic clinical thermometer of the present invention uses a magnetic reed switch encased in glass, poor switch contact will not result even in the unlikely event of a disinfectant such as alcohol penetrating the thermometer enclosure.

In addition to these direct effects, other effects are small size, superlative durability and reliability, and the elimination of dark currents associated with transistor switches, these being realized by combining LSI circuitry with the excellent switching action (100 million switching operations or more) of the magnetic reed switch. As a result, the thermometer can be stored for long periods with minimum replacement of the battery, so there is less chance of finding the thermometer inoperative due to a run-down battery.

Another aspect of the present invention is that the electronic clinical thermometer is equipped with its own case, and the case has a permanent magnet affixed thereto at a prescribed location. Such an arrangement assures that the thermometer will be disposed in a magnetic field when not in use, and enables the thermometer to be carried with ease.

In both embodiments of the present invention as described above, the magnetic reed switch is accommodated in the thermometer enclosure at one end of the major axis of the flat cross-sectional portion thereof. Also, two of the permanent magnets, each having an equivalent magnetic strength, are provided in the case or on the pallet and arranged so that a pair of like poles oppose each other with the thermometer interposed therebetween. Therefore, the magnetic reed switch will never fail to open even if the thermometer is stored with its obverse side faced down. This assures that the battery will not be consumed needlessly when the thermometer is not in use.

Finally, a disinfectant such as alcohol will not penetrate the hollow elongate interior of the thermometer enclosure, so there is no possibility of malfunction due to corrosion of the electronic circuitry. This is true at the end of the enclosure where the heat sensing element is attached liquid-tightly, and at the opposite end plugged by the cap through the intermediary of an O-ring.

As many widely different embodiments of the present invention can be made without departing from the spirit and scope thereof, it is to be understood that the invention is not limited to the specific embodiments thereof except as defined in the appended claims.

What is claimed is:

1. An electronic clinical thermometer which comprises:
   temperature sensing means for sensing body temperature and converting sensed body temperature into a corresponding electrical signal;
   measuring means for converting said electrical signal into a digital signal;
   arithmetic means for computing body temperature on the basis of said digital signal;
   display means for displaying the computed body temperature;
   a battery for supplying each of said previously mentioned means with electrical power;
   a switch coupled between said battery and each of said previously mentioned means;
   an enclosure for accommodating at least said measuring means, arithmetic means, display means, said battery and said switch;
   a case for receiving said enclosure; and
   a permanent magnet provided in said case at a prescribed location;
   said switch comprising a magnetic reed switch which is open when placed in a magnetic field produced by said permanent magnet, and which is closed when withdrawn from said magnetic field.

2. An electronic clinical thermometer according to claim 1, in which at least part of said enclosure includes a portion having a substantially flat transverse cross section, said magnetic reed switch is accommodated within said portion on the major axis of said transverse cross section and offset from the center of said major axis, said case includes a space for receiving said enclosure portion, and said permanent magnet is disposed to confront said space.

3. An electronic clinical thermometer according to claim 1 or claim 2, in which said enclosure comprises a longitudinally extending body, said temperature sensing means being provided at one end thereof, the interior of said enclosure defining a liquid-tight hollow.

4. An electronic clinical thermometer according to claim 3, in which said enclosure is provided with a cap removably fitted on one end thereof opposite said temperature sensing means, and an O-ring interposed between said cap and said enclosure to seal the interior of said hollow body liquid-tightly.

5. An electronic clinical thermometer according to claim 1, wherein said magnetic reed switch is opened when said enclosure is placed in said case, and is closed when said enclosure is withdrawn from said case.

6. An electronic clinical thermometer according to claim 1, wherein said magnetic reed switch is accommodated within said enclosure at one end thereof on a major axis of a transverse cross section thereof.

7. An electronic clinical thermometer according to claim 6, wherein said permanent magnetic is arranged in said case at a prescribed location in the vicinity of said magnetic reed switch when said enclosure is received in said case.

* * * * *